US009453114B2

(12) United States Patent
Kim et al.

(10) Patent No.: US 9,453,114 B2
(45) Date of Patent: Sep. 27, 2016

(54) POLYESTER FILM AND MANUFACTURING METHOD THEREOF

(75) Inventors: Yun Jo Kim, Gumi-si (KR); Gi Sang Song, Gumi-si (KR); Si Min Kim, Daegu (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 138 days.

(21) Appl. No.: 13/062,373

(22) PCT Filed: Sep. 2, 2009

(86) PCT No.: PCT/KR2009/004892
§ 371 (c)(1),
(2), (4) Date: Mar. 4, 2011

(87) PCT Pub. No.: WO2010/027172
PCT Pub. Date: Mar. 11, 2010

(65) Prior Publication Data
US 2011/0160425 A1 Jun. 30, 2011

(30) Foreign Application Priority Data
Sep. 5, 2008 (KR) .................. 10-2008-0087788

(51) Int. Cl.
| B29C 55/14 | (2006.01) |
| B29C 55/20 | (2006.01) |
| B29C 47/00 | (2006.01) |
| B29D 7/01 | (2006.01) |
| B32B 27/36 | (2006.01) |
| C08J 5/18 | (2006.01) |
| B29K 67/00 | (2006.01) |

(52) U.S. Cl.
CPC .......... *C08J 5/18* (2013.01); *B29C 47/00* (2013.01); *B29C 47/0004* (2013.01); *B29C 47/0021* (2013.01); *B29C 47/0059* (2013.01); *B29C 55/14* (2013.01); *B29C 55/143* (2013.01); *B29C 55/20* (2013.01); *B29C 2947/92609* (2013.01); *B29C 2947/92704* (2013.01); *B29C 2947/92761* (2013.01); *B29D 7/01* (2013.01); *B29K 2067/003* (2013.01); *B32B 27/36* (2013.01); *B32B 2307/518* (2013.01); *B32B 2307/734* (2013.01); *C08J 2367/02* (2013.01)

(58) Field of Classification Search
None
See application file for complete search history.

(56) References Cited

U.S. PATENT DOCUMENTS

| 4,617,164 A * | 10/1986 | Kanesaki et al. ......... 264/235.8 |
| 4,725,479 A * | 2/1988 | Utsumi ................... 428/209 |
| 5,053,481 A * | 10/1991 | Ishii ................. C08G 63/065 |
| | | 264/291 |
| 5,091,138 A * | 2/1992 | Ishii ................. C08G 63/065 |
| | | 264/176.1 |
| 5,096,773 A * | 3/1992 | Sakamoto ................... 428/323 |
| 5,139,727 A * | 8/1992 | Utsumi et al. ............. 264/210.7 |
| 5,439,961 A * | 8/1995 | Itoi et al. .................... 524/167 |
| 5,753,377 A * | 5/1998 | Takahashi et al. ........... 428/480 |
| 5,885,501 A * | 3/1999 | Gardner et al. ............. 264/216 |
| 6,130,311 A * | 10/2000 | Kurz ..................... B29C 55/12 |
| | | 528/193 |
| 6,287,667 B1 * | 9/2001 | Kinoshita et al. ........... 428/141 |
| 6,409,862 B1 * | 6/2002 | Kliesch et al. .............. 156/184 |
| 6,409,958 B1 * | 6/2002 | Hosono et al. .............. 264/466 |
| 6,503,599 B1 * | 1/2003 | Tojo ........................ C08J 5/18 |
| | | 428/212 |
| 6,770,351 B1 * | 8/2004 | Kobayashi ............... G11B 5/73 |
| | | 428/212 |
| 7,022,397 B2 * | 4/2006 | Furuya et al. .............. 428/141 |
| 7,790,272 B2 * | 9/2010 | Osada et al. ............... 428/212 |
| 8,231,978 B2 * | 7/2012 | Busch et al. ............... 428/457 |
| 8,591,998 B2 * | 11/2013 | MacKerron ............. B29C 71/02 |
| | | 264/288.4 |
| 2002/0065346 A1 * | 5/2002 | Murschall ............... B32B 27/18 |
| | | 524/323 |
| 2004/0028925 A1 * | 2/2004 | Kusume .................. B29C 55/12 |
| | | 428/480 |
| 2004/0076844 A1 | 4/2004 | Tojo et al. |
| 2004/0247916 A1 * | 12/2004 | MacDonald ............ B29C 55/06 |
| | | 428/523 |
| 2006/0134409 A1 * | 6/2006 | Pecorini .................... C08J 5/18 |
| | | 428/355 R |
| 2007/0009750 A1 * | 1/2007 | Ito ......................... B65D 65/02 |
| | | 428/458 |
| 2014/0065333 A1 * | 3/2014 | Kim ......................... G09F 3/04 |
| | | 428/34.9 |
| 2014/0087107 A1 * | 3/2014 | Kim ......................... G09F 3/04 |
| | | 428/35.7 |

FOREIGN PATENT DOCUMENTS

| CN | 1366685 A | 8/2002 |
| CN | 1512934 A | 7/2004 |
| CN | 1565835 A | 1/2005 |
| CN | 101134367 A | 3/2008 |
| EP | 0 122 787 | * 10/1984 |

(Continued)

OTHER PUBLICATIONS

Schimtz, Peter et al., "Films." Ullmann's Encyclopedia of Industrial Chemistry, 5th Ed., vol. A11 (1988), pp. 85-110.*

(Continued)

*Primary Examiner* — Vivian Chen
(74) *Attorney, Agent, or Firm* — Sughrue Mion, PLLC

(57) ABSTRACT

Provided is a polyester film having excellent high-temperature dimensional stability. More particularly, provided is a method for producing a polyester film, including: a) extruding and cooling a polyester resin to provide a non-oriented sheet; b) orienting the sheet in the machine direction (MD); c) orienting the MD oriented sheet in the transverse direction (TD); d) heat treating the sheet; and e) carrying out simultaneous relaxation by subjecting the heat treated sheet to MD relaxation at a ratio of 1% or higher, while subjecting it to TD relaxation in a tenter. Provided also is a polyester film obtained by the method.

5 Claims, No Drawings

(56) References Cited

FOREIGN PATENT DOCUMENTS

| | | | |
|---|---|---|---|
| EP | 1 197 976 A1 | | 4/2002 |
| JP | 44-20240 B | | 9/1969 |
| JP | 08-193137 A | | 7/1996 |
| JP | 10-180866 A | | 7/1998 |
| JP | 2000-038463 | * | 2/2000 |
| JP | 2000-141472 A | | 5/2000 |
| JP | 2000-309051 | * | 11/2000 |
| JP | 2001-191406 | * | 7/2001 |
| JP | 2002-001810 | * | 1/2002 |
| JP | 2003-201357 A | | 7/2003 |
| JP | 2003-311907 A | | 11/2003 |
| JP | 2004-042528 A | | 2/2004 |
| JP | 2008-265318 A | | 11/2008 |
| KR | 10-0369441 | * | 3/2003 |
| KR | 100369441 B1 | * | 3/2003 |
| KR | 100369442 B1 | * | 3/2003 |
| TW | 309528 B | | 7/1997 |
| WO | WO 2007/091090 | * | 8/2007 |
| WO | WO 2008/040646 | * | 4/2008 |

OTHER PUBLICATIONS

KR 10-0369441 B1 (English Abstract) Kim Yoon Soo et al (published Mar. 17, 2003).*

KR 10-0369442 B1 (English Abstract) Kim Yoon Soo et al (published Mar. 28, 2003).*

Notification of Office Action dated Dec. 20, 2013, issued in corresponding Korean Patent Application No. 10-2008-0087788.

Japan Patent Office, Communication dated Jun. 4, 2013, issued in corresponding Japanese application No. 2011-525972.

Chinese Patent Office, Chinese Office Action issued Jun. 4, 2013 in corresponding Chinese Application No. 200980134630.5.

Chinese Patent Office, Chinese Office Action issued in corresponding CN Application No. 200980134630.5, dated Nov. 5, 2012.

Taiwan Intellectual Property Office; Communication dated Apr. 8, 2014 issued in counterpart application No. 098129949.

* cited by examiner

POLYESTER FILM AND MANUFACTURING METHOD THEREOF

CROSS REFERENCE TO RELATED APPLICATIONS

This application is a National Stage of International Application No. PCT/KR2009/004892, filed on Sep. 2, 2009, which claims priority from Korean Patent Application No. 10-2008-0087788 filed on Sep. 5, 2008, the contents of all of which are incorporated herein by reference in their entirety.

TECHNICAL FIELD

The present invention relates to a polyester film, and more particularly, to a polyester film used in a base film for a prism film.

BACKGROUND ART

Biaxially oriented polyester films have been used in various industrial fields because of their excellent mechanical properties, thermal properties, electrical properties and chemical resistance.

Particularly, optical polyester films are generally subjected to heat treatment during the preparation thereof in order to improve the dimensional stability of oriented films. However, such heat treatment still has limitations in improving shrinkage along the machine direction (MD). Additionally, high temperature during such heat treatment causes degradation of tensile strength/elongation and optical properties.

In general, such heat treatment allows reduction of shrinkage stress along MD. However, such simple heat treatment has a limitation in lowering shrinkage along MD.

Therefore, there have been many studies to develop various methods for improving dimensional stability of a polyester film.

DISCLOSURE

Technical Problem

An object of the present invention is to provide a polyester film having excellent high-temperature dimensional stability.

More particularly, an object of the present invention is to provide a method for producing a polyester film having an improved shrinkage in the machine direction (also referred to as 'MD' hereinafter).

Another object of the present invention is to provide a polyester film having a shrinkage of 0.5% or less (150° C., 30 minutes) in MD, maximum shrinkage stress of 0.20 kg/mm$^2$ or less (150° C., 3 minutes, initial load 0.007 kg/mm$^2$) in MD, and maximum shrinkage stress of 0.05 kg/mm$^2$ or less (150° C., 3 minutes, initial load 0.007 kg/mm$^2$) in the transverse direction (also referred to as 'TD' hereinafter).

Still another object of the present invention is to provide a polyester film suitable for use in a base film of a prism film.

Technical Solution

To achieve the object of the present invention, the present invention provides a method for producing a polyester film having excellent high-temperature dimensional stability by reducing the shrinkage of the film in the machine direction (MD) during the fabrication thereof.

Particularly, the method disclosed herein includes subjecting a film that has been heat treated after the orientation in MD and transverse direction (TD) to relaxation, thereby improving the stability of the film. It has now been found that when the film is subjected to TD relaxation and MD relaxation at the same time, the film has most effectively improved high-temperature dimensional stability. The present invention is based on this finding.

More particularly, the present invention provides a method for producing a polyester film having improved high-temperature dimensional stability, including:

a) extruding and cooling a polyester resin to provide a non-oriented sheet;
b) orienting the sheet in MD;
c) orienting the MD oriented film in TD;
d) heat treating the film; and
e) carrying out simultaneous relaxation by subjecting the heat treated film to MD relaxation at a ratio of 1% or higher, while subjecting it to TD relaxation in a tenter.

According to one embodiment, such simultaneous relaxation may be carried out, based on the length of the oriented film, under a ratio of 1-10% in TD and 1-10% in MD, at a temperature 5-35° C. lower than the heat treatment temperature, particularly, at a temperature ranging from 170° C. to 240° C.

The present invention will be explained in more detail hereinafter.

As used herein, there is no particular limitation in the polyester as long as the polyester is one generally used in films. More particularly, polyethylene terephthalate (PET) or resins including copolymers whose main repeating units are ethylene terephthalate are used.

The polyester is obtained by polycondensation of a diol with a dicarboxylic acid. Particular examples of the dicarboxylic acid that may be used in the present invention include terephthalic acid, isophthalic acid, phthalic acid, naphthalene dicarboxylic acid, adipic acid, sebacic acid, etc. Particular examples of the diol that may be used in the present invention include ethylene glycol, trimethylene glycol, tetramethylene glycol, cyclohexane dimethanol, etc. Particular examples of the polyester that may be used in the present invention include polymethylene terephthalate, polyethylene terephthalate, polypropylene terephthalate, polyethylene isophthalate, polytetramethylene terephthalate, polyethylene-p-oxybenzoate, poly-1,4-cyclohexylenedimethylene terephthalate, polyethylene-2,6-naphthalate, etc. The above polyester polymers may be homopolymers or copolymers. In the case of copolymers, particular examples of comonomers include diols, such as diethylene glycol, neopentyl glycol and polyalkylene glycol, dicarboxylic acids, such as adipic acid, sebacic acid, phthalic acid, isophthalic acid and 2,6-naphthalene dicarboxylic acid, and hydroxycarboxylic acids, such as hydroxybenzoic acid and 6-hydroxy-2-naphthoic acid.

According to one embodiment of the present invention, polyethylene terephthalate, polyethylene naphthalate (polyethylene-2,6-naphthalate), and copolymers and modified polymers thereof are preferred.

As used herein, the term 'orientation' is broadly classified into MD orientation wherein a film is pulled in MD by a difference in speeds of rollers so that the film is oriented in MD, and TD orientation wherein a film is pulled in TD by conveying the film in a tenter while both ends thereof are fixed with clips so that the film is oriented in TD.

According to the present invention, there are no particular limitations in orientation temperature where the polyester film is oriented, particularly preheating temperature, orientation roller temperature or IR-heater temperature, number of orientation works and orientation patterns.

In a more preferred embodiment, a polyester film is preliminarily oriented to 1-10 times in MD while being passed through an IR heater zone heated to 600-900° C. after preheating, and then is further oriented to 1-3 times while being passed through an IR heater zone heated to 500-800° C., so that the total MD orientation is made at 1-10 times.

Continuously, the MD oriented film is passed through a preheating zone, subjected to TD orientation at 1-10 times under a temperature of 100-200° C., and then heat treated and fixed at 205-245° C.

Then, the oriented film is subjected to TD relaxation at a temperature 5-35° C. lower than the heat treatment temperature, particularly at a temperature of 170-240° C. Simultaneously with the TD relaxation, MD relaxation is carried out at a ratio of 1% or higher to improve high-temperature dimensional stability in MD.

More particularly, such simultaneous relaxation accomplishes TD relaxation at 1-10% and MD relaxation at 1% or higher. Although there is no particular limitation in the ratio of TD relaxation during such simultaneous relaxation, TD relaxation is suitably performed at 1-10% and MD relaxation is preferably performed at 1-10%. More preferably, MD relaxation is performed at 3-8% in view of good optical properties as well as thermal shrinkage.

When MD relaxation is performed at a ratio less than 1%, it is not possible to obtain a sufficient MD relaxation effect, and it is difficult to obtain heat shrinkage of 0.5% or less in MD. On the other hand, when MD relaxation is performed at a ratio higher than 10%, MD strength of the film is excessively degraded, and the film shows poor appearance due to film wrinkling caused by limitations in equipment.

More preferably, MD relaxation is performed at 3-8%. MD relaxation at 3-8% allows heat shrinkage of 0.4% or less in MD. Thus, it is possible to obtain a film that shows low thermal deformation during the fabrication of a prism film and has excellent optical properties.

As used herein, the term 'relaxation' means stress relaxation performed by conveying a film while both ends of the film are fixed with clips to relax the film in MD and TD.

In addition, the term 'simultaneous relaxation' means TD relaxation occurring simultaneously with MD relaxation. Such simultaneous relaxation may be carried out several times in different zones. In other words, TD relaxation and MD relaxation may be performed at the same time in a multi-step manner. Herein, simultaneous relaxation may be carried out in at least one zone.

Referring to heat shrinkage of the film disclosed herein, the film has heat shrinkage of 0.5% or less in MD as determined in an oven at 150° C. for 30 minutes under a tension-free condition. More particularly, the film has heat shrinkage of 0.0-0.5% in MD. In addition, as determined with Testrite at 150° C. for 3 minutes under an initial load of 0.007 kg/mm$^2$, the film has a maximum shrinkage stress of 0.20 kg/mm$^2$ or less in MD and a maximum shrinkage stress of 0.05 kg/mm$^2$ or less in TD.

When the film has a heat shrinkage higher than 0.5% in MD, the film may cause thermal deformation during the fabrication of a prism film or during the use of a finished product, so that it may be wrinkled and have low flatness, resulting in generation of defected products. Therefore, the film preferably has heat shrinkage of 0.5% or less in MD.

In addition, the film has a maximum shrinkage stress of 0.20 kg/mm$^2$ or less, particularly 0.00-0.20 kg/mm$^2$, in MD, and maximum shrinkage stress of 0.05 kg/mm$^2$ or less, particularly 0.00-0.05 kg/mm$^2$, in TD. When the maximum shrinkage stress is higher than 0.20 kg/mm$^2$ in MD, the film may cause deformation on the coating layer by the heat applied thereto during the process, resulting in deterioration of the film appearance. When the maximum shrinkage stress is higher than 0.05 kg/mm$^2$ in TD, the film may cause waving and wrinkling, resulting in degradation of flatness.

Therefore, an object of the present invention is to provide a film satisfying all of the above conditions. Such films satisfying all of the above conditions may provide prism films having excellent high-temperature dimensional stability and optical properties.

The polyester film disclosed herein may further include various additives, such as inorganic and organic particles, antioxidants, antistatic agents and crystal nucleating agents. Although there is no particular limitation in the compound that may be used as the inorganic particles, particular examples of the compound include oxides, such as silicon oxide, aluminum oxide, magnesium oxide and titanium oxide, compound oxides, such as kaolin, talc and montmorillonite, carbonates, such as calcium carbonate and barium carbonate, sulfates, such as calcium sulfate and barium sulfate, titanates, such as barium titanate and potassium titanate, phosphates, such as calcium phosphate tribasic, calcium phosphate dibasic and calcium phosphate monobasic, or the like. If desired, the above-mentioned compounds may be used in combination.

Although there is no limitation in the organic particles that may be used in the present invention, particular examples of the organic particles include vinyl-based particles, such as polystyrene particles or crosslinked polystyrene particles, styrene acrylic particles or acrylic crosslinked particles, styrene methacrylic particles, methacrylic crosslinked particles, benzoguanamine-formaldehyde particles, silicone particles, polytetrafluoroethylene particles, or the like. Any organic polymer microparticles may be used as long as they are not soluble in polyester. In addition, such organic particles are preferably spherical particles and have a uniform particle size distribution in view of lubricability and uniformity in forming film surface roughness. The particles may have a particle diameter, amount, shape, etc. selected suitably according to the particular use and purpose. Preferably, the particles have an average particle diameter of 0.2-5.0 μm and are used in an amount of 10-1000 ppm.

The film disclosed herein may have a total thickness determined suitably according to the particular use and purpose of the film. The film disclosed herein may be used as a base film for a prism film and preferably has a thickness of 50-350 μm.

Advantageous Effects

The present invention provides a polyester film having excellent high-temperature dimensional stability by reducing the shrinkage in the machine direction (MD) during the fabrication thereof.

In general, heat shrinkage in the transverse direction (TD) may be controlled with ease through the heat treatment and relaxation. However, it is difficult to control the shrinkage in MD. Moreover, controlling the shrinkage in MD is accompanied with degradation of physical properties.

To reduce the shrinkage in MD, heat treatment temperature in a tenter or MD orientation ratio may be reduced. However, in these cases, controlling the shrinkage is limited, and the resultant film may cause degradation of the mechanical properties and optical properties. Thus, it is difficult to obtain films suitable for use in industrial films.

Under such circumstances, the present invention provides a method for controlling MD shrinkage and TD shrinkage at the same time while not adversely affecting the physical properties and optical properties of a polyester film, thereby providing a film having excellent high-temperature dimensional stability and suitable for use in industrial films and optical films.

In addition, application of the film disclosed herein reduces defect caused, for example, by thermal deformation during the post-treatment of the film, including coating and heat treatment, because of such excellent thermal dimensional stability of the film. Further, during the use of a finished film, the film causes little thermal deformation, and thus maintains its unique properties and flatness, resulting in improvement of the commercial and industrial value of the film.

MODE FOR INVENTION

Hereinafter, the embodiments of the present invention will be described in detail with reference to examples and tests. However, the following examples are for illustrative purposes only and not intended to limit the scope of this disclosure.

Herein, the physical properties of the film are determined by the following methods.

1) Heat Shrinkage

A film is cut into a 20 cm×20 cm square and the machine direction (MD) length and transverse direction (TD) length of the film are measured. Next, the film is subjected to heat shrinking in an oven at 150° C. for 30 minutes under a load-free condition. After the heat shrinking, the MD length and TD length of the film are measured, and the MD heat shrinkage and TD heat shrinkage are calculated according to Formula 1:

Heat Shrinkage (%)={(Length before shrinking−Length after shrinking)/Length before shrinking}×100  <Formula 1>

2) Maximum Shrinkage Stress

Testrite (MKV Shrinkage-Force Tester, Testrite Ltd.) is used to measure the MD shrinkage stress and TD shrinkage stress with time at 150° C. for 3 minutes. Herein, the maximum shrinkage stress in each direction is divided by the sectional area of the sample and the maximum shrinkage stress is calculated according to Formula 2.

The sample has a width of 15 mm and a length of 400 mm. The sample is subjected to an initial load of 0.007 Kg/mm$^2$ so that it may be fixed in a flattened state.

Maximum shrinkage stress=Measured maximum shrinkage stress (kg)/Sectional area of sample (width×thickness;mm$^2$)  <Formula 2>

EXAMPLE

Measured maximum shrinkage stress: 10 N (1.02 kg=10/9.8 kg)

Sectional area of sample: 1.5 mm$^2$ (width 15 mm, thickness 100 μm)

Maximum shrinkage stress (kg/mm$^2$)=1.02 kg/1.5 mm$^2$=0.68 kg/mm$^2$

3) Tensile Strength/Elongation

A film with a width of 15 mm, a gauge length of 50 mm and cross heat-up speed of 500 mm/min is provided. The tensile properties of the film are measured in MD and TD using a multi-purpose tensile test machine (Instron, Tensile Test Machine).

4) Evaluation of Optical Properties (Haze Determination)

Haze determination is based on ASTM D-1003. Seven portions, including two peripheral portions and one central portion, are randomly extracted from a polyester film. Next, the portions are cut from the sample into a size of 5 cm×5 cm and introduced into a haze determination system (Nippon Denshoku NDH 300A). Then, light with a wavelength of 555 nm is transmitted through the system, and then the haze is calculated according to Formula 3 and expressed as an average value except the maximum/minimum values.

Haze (%)=(Total scattered light/Total transmitted light)×100  <Formula 3>

Example 1

First, 100 mol % of terephthalic acid, 124 mol % of ethylene glycol as a glycol component, and 0.05 mol of antimony trioxide as a catalyst based on the acid component are polycondensed via direct esterification to obtain polyester having an intrinsic viscosity of 0.64 dl/g, which, in turn, is melt extruded at 275° C., followed by rapid cooling, to provide a non-oriented sheet.

The non-oriented sheet is preheated through a set of rollers (MDO; Machine Direction Organization) conveyed in MD, and then is oriented continuously through an IR heater zone heated to 760° C. to 2.5 times and through an IR heater zone heated to 650° C. to 1.3 times. In this manner, the sheet is oriented in MD to a total MD orientation ratio of 3.25 times.

Right after the MD orientation, the sheet is conveyed to a tenter, passed continuously through a preheating zone at 125° C., oriented at 150° C. in TD to 3.5 times, and then heat treated at 230° C. Right after the heat treatment, the sheet is subjected to TD relaxation at 4.2% in a zone heated to 210° C. At the same time, the sheet is subjected to MD relaxation at 4% to obtain a film with a thickness of 125 μm.

The resultant film is determined for the heat shrinkage, maximum shrinkage stress, tensile strength/elongation and haze. The results are shown in Table 2.

Examples 2-4

Non-oriented sheets are obtained in the same manner as described in Example 1, except that the MD orientation ratio, IR heater zone temperature, heat treatment temperature, MD relaxation ratio, TD relaxation ratio, number of relaxation zones, relaxation temperature and MD/TD relaxation gradient in the relaxation zones are varied to obtain different films. The varied conditions are shown in detail in Table 1. The characteristics of the films are shown in Table 2.

Comparative Example 1

A film is obtained in the same manner as described in Example 1, except that the film is conveyed to the tenter and TD oriented, right after the MD orientation, subjected to MD relaxation at 6% in a zone heated to 210° C., and then continuously subjected to TD relaxation at 4.2% in a zone heated to 210° C. The characteristics of the resultant film are shown in Table 2.

Comparative Example 2

A film is obtained in the same manner as described in Example 1, except that the film is merely subjected to TD relaxation at 4.2%, after the TD orientation, in a zone heated to 210° C. without any MD relaxation. The characteristics of the resultant film are shown in Table 2.

Comparative Example 3

A film is obtained in the same manner as described in Comparative Example 2, except that the heat treatment zone temperature is set to 245° C. The characteristics of the resultant film are shown in Table 2.

Comparative Example 4

A film is obtained in the same manner as described in Example 1, except that the film is subjected to MD relaxation at 0.8%. The characteristics of the resultant film are shown in Table 2.

TABLE 1

|  | MD orientation ratio (times) | IR Heater temperature (° C.) | Heat treatment temperature (° C.) | MD relaxation ratio (%) | TD relaxation ratio (%) | Relaxation zone temperature (° C.) | MD relaxation gradient | TD relaxation gradient | Simultaneous relaxation |
|---|---|---|---|---|---|---|---|---|---|
| Ex. 1 | 2.5 × 1.3 | 760/650 | 230 | 4 | 4.2 | 210 | none | none | ○ |
| Ex. 2 | 2.6 × 1.5 | 820/680 | 240 | 6 | 4.2 | 230/210 | 4/2 | 2.8/1.4 | ○ |
| Ex. 3 | 2.4 × 1.25 | 700/620 | 215 | 8 | 6.3 | 200/180/160 | 4/2.5/1.5 | 3.5/1.7/1.1 | ○ |
| Ex. 4 | 2.4 × 1.2 | 650/560 | 240 | 1.5 | 4.2 | 230/220 | 1.5/— | 3/1.2 | ○ |
| Comp. Ex. 1 | 2.5 × 1.3 | 760/650 | 230 | 4 | 4.2 | 210 | None | none | x |
| Comp. Ex. 2 | 2.5 × 1.3 | 760/650 | 230 | — | 4.2 | 210 | none | none | x |
| Comp. Ex. 3 | 2.5 × 1.3 | 760/650 | 245 | — | 4.2 | 210 | none | none | x |
| Comp. Ex. 4 | 2.5 × 1.3 | 760/650 | 230 | 0.8 | 4.2 | 210 | none | none | ○ |

In Table 1, MD (TD) relaxation ratio, MD (TD) relaxation gradient, and relaxation zone temperature have the meanings as described hereinafter.

MD (TD) relaxation ratio: total relaxation ratio given in MD (TD)

MD (TD) relaxation gradient: total relaxation ratio given in MD (TD) divided into different ratios in different relaxation zones Example: MD relaxation ratio 6%, MD relaxation gradient 3/2/1 & TD relaxation ratio 4.2%, TD relaxation gradient 2.1/1.4/0.7 (A total MD relaxation ratio of 6% is applied to three different zones, wherein the MD relaxation ratio of the first zone is 3%, that of the second zone is 2%, and that of the third zone is 1%. Similarly, a total TD relaxation ratio of 4.2% is applied to three different zones, wherein the TD relaxation ratio of the first zone is 2.1%, that of the second zone is 1.4%, and that of the third zone is 0.7%)

Relaxation zone temperature: Temperature of the zone to which the MD relaxation ratio and the TD relaxation ratio are applied.

TABLE 2

|  | Strength (kg/mm²) | | Elongation (%) | | Shrinkage (%) | | Maximum shrinkage stress (kg/mm²) | | Haze (%) |
|---|---|---|---|---|---|---|---|---|---|
|  | MD | TD | MD | TD | MD | TD | MD | TD |  |
| Ex. 1 | 19.7 | 18.8 | 165.4 | 135.6 | 0.2 | 0.3 | 0.03 | 0.01 | 1.71 |
| Ex. 2 | 24.2 | 18.5 | 156.8 | 143.4 | 0.1 | 0.2 | 0.00 | 0.01 | 1.83 |
| Ex. 3 | 18.5 | 17.3 | 187.5 | 153.2 | 0.3 | 0.1 | 0.10 | 0.01 | 1.56 |
| Ex. 4 | 16.5 | 16.4 | 170.5 | 130.3 | 0.5 | 0.4 | 0.17 | 0.03 | 1.94 |
| Comp. Ex. 1 | 20.5 | 19.7 | 158.3 | 130.2 | 0.8 | 0.3 | 0.15 | 0.01 | 1.75 |
| Comp. Ex. 2 | 21.5 | 20.3 | 146.3 | 125.7 | 1.0 | 0.9 | 0.35 | 0.10 | 1.70 |
| Comp. Ex. 3 | 13.7 | 15.5 | 210.2 | 168.5 | 0.7 | 0.5 | 0.27 | 0.06 | 2.52 |
| Comp. Ex. 4 | 20.7 | 19.5 | 150.2 | 133.3 | 0.7 | 0.9 | 0.22 | 0.07 | 1.73 |

As can be seen from Table 2, the film disclosed herein has a shrinkage of 0.5% or less (150° C., 30 minutes) in MD, maximum shrinkage stress of 0.20 kg/mm² or less (150° C., 3 minutes, initial load 0.007 kg/mm²) in MD, and maximum shrinkage stress of 0.05 kg/mm² or less (150° C., 3 minutes, initial load 0.007 kg/mm²) in TD.

On the contrary, the film subjected to TD relaxation after MD relaxation according to Comparative Example 1 has shrinkage of 0.8% in MD. When fabricating a prism film with the comparative film, the film causes thermal deformation and wrinkling, and thus shows low flatness.

The present application contains subject matter related to Korean Patent Application No. 10-2008-0087788, filed in the Korean Intellectual Property Office on Sep. 5, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

As can be seen from the foregoing, the present invention provides a polyester film having excellent high-temperature dimensional stability by reducing the shrinkage in the machine direction (MD) during the fabrication thereof. In addition, application of the film disclosed herein reduces defect caused, for example, by thermal deformation during the post-treatment of the film, including coating and heat treatment, because of such excellent thermal dimensional stability of the film. Further, during the use of a finished film, the film causes little thermal deformation, and thus maintains its unique properties and flatness, resulting in improvement of the commercial and industrial value of the film.

The invention claimed is:

1. A method for producing a polyethylene terephthalate film comprising:
   (a) extruding and cooling a polyethylene terephthalate resin to provide a non-oriented polyethylene terephthalate sheet;
   (b) orienting the polyethylene terephthalate sheet in machine direction (MD) to give a MD orientated polyethylene terephthalate film;
   (c) orienting the MD oriented polyethylene terephthalate film obtained in step (b) in transverse direction (TD);
   (d) heat treating the resulting biaxially oriented polyethylene terephthalate film obtained in step (c); and
   (e) carrying out simultaneous relaxation by subjecting the heat treated polyethylene terephthalate film of step (d) to a MD relaxation at a ratio of 3-8%, while subjecting it to a TD relaxation at a ratio of 3-8% in a tenter,
   wherein in step (b), the polyethylene terephthalate film is oriented at 1-10 times in the MD while being passed through an IR heater zone heated to 600-900° C., and then is further oriented 1-3 times while being passed through an IR heater zone heated to 500-800° C., so that the total MD-orientation is made 1-10 times;
   the MD-oriented film is passed through a preheating zone, subjected to TD-orientation 1-10 times;
   wherein the polyethylene terephthalate film has a shrinkage of 0.4% or less at 150° C. for 30 minutes in the MD, a maximum shrinkage stress of 0.20 kg/mm$^2$ or less at 150° C. for 3 minutes and an initial load 0.007 kg/mm$^2$ in MD, and a maximum shrinkage stress of 0.05 kg/mm$^2$ or less at 150° C. for 3 minutes and an initial load 0.007 kg/mm$^2$ in TD; and
   wherein the polyethylene terephthalate film has a thickness of 50 to 350 μm.

2. The method for producing a polyethylene terephthalate film according to claim 1, wherein the simultaneous relaxation is carried out by applying TD relaxation simultaneously with MD relaxation in at least one zone.

3. The method for producing a polyethylene terephthalate film according to claim 2, wherein the simultaneous relaxation is carried out at a temperature 5-35° C. lower than the heat treatment temperature of step (d).

4. The method for producing a polyethylene terephthalate film according to claim 3, wherein the simultaneous relaxation is carried out at a temperature of 170-240° C.

5. The method for producing a polyethylene terephthalate film according to claim 4, wherein the simultaneous relaxation is carried out by simultaneously controlling an interval between adjacent clips and width in a tenter to relax stress of the film.

* * * * *